United States Patent
Li et al.

(10) Patent No.: US 10,698,526 B2
(45) Date of Patent: Jun. 30, 2020

(54) COMPENSATION CIRCUIT, GATE DRIVING UNIT, GATE DRIVING CIRCUIT, DRIVING METHODS THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Feng Li, Beijing (CN); Liang Zhang, Beijing (CN); Yu Ma, Beijing (CN); Qi Sang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 73 days.

(21) Appl. No.: 15/966,524

(22) Filed: Apr. 30, 2018

(65) Prior Publication Data
US 2019/0129562 A1 May 2, 2019

(30) Foreign Application Priority Data
Oct. 31, 2017 (CN) .......................... 2017 1 1048644

(51) Int. Cl.
*G06F 3/041* (2006.01)
*G09G 3/36* (2006.01)
*G09G 3/3266* (2016.01)

(52) U.S. Cl.
CPC .......... *G06F 3/0416* (2013.01); *G06F 3/0412* (2013.01); *G09G 3/3266* (2013.01); *G09G 3/3677* (2013.01); *G09G 2300/0408* (2013.01); *G09G 2300/0819* (2013.01); *G09G 2310/0286* (2013.01); *G09G 2310/0289* (2013.01)

(58) Field of Classification Search
CPC combination set(s) only.
See application file for complete search history.

(56) References Cited

U.S. PATENT DOCUMENTS

| 2003/0231735 A1* | 12/2003 | Moon | G09G 3/3685 377/64 |
| 2008/0170064 A1* | 7/2008 | Lee | G09G 3/3677 345/214 |
| 2011/0157263 A1* | 6/2011 | Kim | G09G 3/3677 345/698 |

(Continued)

*Primary Examiner* — Kwin Xie
(74) *Attorney, Agent, or Firm* — Brooks Kushman P.C.

(57) ABSTRACT

A compensation circuit, a gate driving unit, a gate driving circuit, driving methods thereof and a display device are provided. The compensation circuit includes: a pull-up node voltage control sub-circuit configured to control a first voltage input end to output a first voltage to a pull-up node voltage output end under the control of a control node; and a control node control sub-circuit configured to control a voltage compensation clock signal input end to input a voltage compensation clock signal to the control node under the control of a pull-up input end, control a second voltage input end to input a second voltage to the control node under the control of a voltage compensation resetting end, and control a touch ending signal input end to input a touch ending signal to the control node under the control of a pull-up node voltage output end.

13 Claims, 4 Drawing Sheets

(56) References Cited

U.S. PATENT DOCUMENTS

| | | | |
|---|---|---|---|
| 2011/0273417 A1* | 11/2011 | Shin | G09G 3/20 |
| | | | 345/211 |
| 2014/0191937 A1* | 7/2014 | Xu | G09G 3/3648 |
| | | | 345/99 |
| 2016/0141352 A1* | 5/2016 | Sung | G09G 3/3233 |
| | | | 257/40 |
| 2017/0270879 A1* | 9/2017 | Han | G09G 3/3648 |

* cited by examiner

COMPENSATION CIRCUIT, GATE DRIVING UNIT, GATE DRIVING CIRCUIT, DRIVING METHODS THEREOF AND DISPLAY DEVICE

CROSS-REFERENCE TO RELATED APPLICATION

This application claims priority to Chinese Patent Application No. 201711048644.8 filed on Oct. 31, 2017, which is incorporated herein by reference in its entirety.

TECHNICAL FIELD

The present disclosure relates to the field of display driving technology, in particular to a compensation circuit, a gate driving unit, a gate driving circuit, driving methods thereof, and a display device.

BACKGROUND

Currently, a Gate On Array (GOA) circuit has been widely used in a display device, e.g., Thin Film Transistor-Liquid Crystal Display (TFT-LCD) display or Active-Matrix Organic Light-Emitting Diode (AMOLED) display, due to such advantages as small volume, low cost and high integration level. In the related art, in the case of low-frequency output, a potential at a pull-up node of a gate driving unit may decrease.

For the GOA circuit associated with Touch Display Driver Integration (TDDI), a touch stage is provided between two display stages. In the case of performing a touch scanning operation at the touch stage, the GOA circuit needs to stop performing a display driving scanning operation and then perform the display driving scanning operation after a touch operation, so as to perform the touch operation and a display operation alternately. In the case that the GOA circuit is of a 2CLK structure (i.e., it includes two clock signal lines), the touch stage starts after a gate driving signal is outputted by a gate driving unit in an $N^{th}$ row. At this time, a potential at a pull-up node of a gate driving unit in an $(N+1)^{th}$ row is changed to be a high level and maintained at the high level until the touch stage is ended, where N is a positive integer greater than 1. The gate driving signal is outputted after a voltage is applied to the clock signal line. The touch stage is maintained for a relatively long time period (usually hundreds of microseconds), so the potential at the pull-up node of the gate driving unit may be pulled down due to a leakage current of a TFT. In the case that the potential at the pull-up node decreases gradually, the output of the gate driving signal from the gate driving unit in the $(N+1)^{th}$ row may be adversely affected.

SUMMARY

A main object of the present disclosure is to provide a compensation circuit, a gate driving unit, a gate driving circuit, driving methods thereof and a display device, so as to solve the technical problem in the related art where it is impossible to output the corresponding gate driving signal in the case that the potential at the pull-up node of the gate driving unit is pulled down due to the touch stage or the low-frequency output, thereby to achieve normal display.

In one aspect, the present disclosure provides in some embodiments a compensation circuit, including a pull-up node voltage output end, a voltage compensation clock signal input end, a touch ending signal input end, a pull-up input end and a voltage compensation resetting end. The compensation circuit further includes: a pull-up node voltage control sub-circuit connected to a first voltage input end, a control node and the pull-up node voltage output end, and configured to control the first voltage input end to output a first voltage to the pull-up node voltage output end under the control of the control node; and a control node control sub-circuit connected to the voltage compensation clock signal input end, the touch ending signal input end, the pull-up input end, the voltage compensation resetting end, the pull-up node voltage output end, the control node and a second voltage input end, and configured to control the voltage compensation clock signal input end to input a voltage compensation clock signal to the control node under the control of the pull-up input node, control the second voltage input end to input a second voltage to the control node under the control of the voltage compensation resetting end, and control the touch ending signal input end to input a touch ending signal to the control node under the control of the pull-up node voltage output end.

In a possible embodiment of the present disclosure, the pull-up node voltage control sub-circuit includes a first transistor, a gate electrode of which is connected to the control node, a first electrode of which is connected to the first voltage input end, and a second electrode of which is connected to the pull-up node voltage output end.

In a possible embodiment of the present disclosure, the control node control sub-circuit includes: a second transistor, a gate electrode of which is connected to the pull-up input end, a first electrode of which is connected to the voltage compensation clock signal input end, and a second electrode of which is connected to the control node; a third transistor, a gate electrode of which is connected to the pull-up node voltage output end, and a second electrode of which is connected to the control node; and a fourth transistor, a gate electrode of which is connected to the voltage compensation resetting end, a first electrode of which is connected to the control node, and a second electrode of which is connected to the second voltage input end.

In a possible embodiment of the present disclosure, the compensation circuit further includes a fifth transistor. A first electrode of the third transistor is connected to the touch ending signal input end via the fifth transistor, a gate electrode and a first electrode of the fifth transistor are connected to the touch ending signal input end, and a second electrode of the fifth transistor is connected to the first electrode of the third transistor.

In another aspect, the present disclosure provides in some embodiments a gate driving unit including a shift register unit circuit and the above-mentioned compensation circuit. The shift register unit circuit includes a shift resetting end, a shift clock signal input end, a pull-up node, a pull-down node, a gate driving signal output end, a pull-up resetting sub-circuit, a pull-up node control sub-circuit, a pull-down node control sub-circuit, a storage capacitor sub-circuit, an output sub-circuit and an output resetting sub-circuit. The pull-up node is connected to a pull-up node voltage output end of the compensation circuit. A pull-up input end of the compensation circuit is connected to a pull-up node of a previous-level gate driving unit. A voltage compensation clock signal input end of the compensation circuit is connected to a voltage compensation clock signal line for outputting a voltage compensation clock signal. A voltage compensation resetting end of the compensation circuit is connected to the gate driving signal output end. A touch ending signal input end of the compensation circuit is connected to a touch ending signal line. The shift clock signal input end is connected to a shift clock signal line for outputting a shift clock signal. The pull-up resetting sub-circuit is connected to the shift resetting end, a third voltage input end and the pull-up node, and configured to control the third voltage input end to input a third voltage to the pull-up node under the control of the shift resetting end. The pull-up node control sub-circuit is connected to the pull-up node, the pull-down node and the third voltage input end, and configured to control the third voltage input end to input the third voltage to the pull-up node under the control of the pull-down node. The pull-down node control sub-circuit is connected to the pull-up node, the pull-down node, a fourth voltage input end and the third voltage input end, and configured to control a potential at the pull-down node under the control of the pull-up node. A first end of the storage capacitor sub-circuit is connected to the pull-up node, and a second end thereof is connected to the gate driving signal output end. The output sub-circuit is connected to the gate driving signal output end, the pull-up node and the shift clock signal input end, and configured to control the shift clock signal input end to input a shift clock signal to the gate driving signal output end under the control of the pull-up node. The output resetting sub-circuit is connected to the gate driving signal output end, the pull-down node and the third voltage input end, and configured to control the third voltage input end to output the third voltage to the gate driving signal output end under the control of the pull-down node.

In a possible embodiment of the present disclosure, the third voltage is a low voltage, and a fourth voltage from the fourth voltage input end is a high voltage.

In yet another aspect, the present disclosure provides in some embodiments a method for driving the above-mentioned gate driving unit, including a step of controlling, by a compensation circuit, a potential at a pull-up node voltage output end under the control of a voltage compensation clock signal input end, a touch ending signal input end, a pull-up input end and a voltage compensation resetting end, so as to control a potential at a pull-up node of a shift register unit circuit of the gate driving unit.

In a possible embodiment of the present disclosure, the method includes: within an input time period of each display stage, controlling, by a control node control sub-circuit, the voltage compensation clock signal input end to input a voltage compensation clock signal to a control node under the control of a pull-up node of a previous-level gate driving unit, and controlling, by a pull-up node voltage control sub-circuit, a first voltage input end to input a first voltage to the pull-up node voltage output end, under the control of the control node, so as to pull-up a potential at the pull-up node; and within an output time period of each display stage, controlling, by the shift register unit circuit, the gate driving signal output end to output a corresponding gate driving signal under the control of the pull-up node.

In a possible embodiment of the present disclosure, the display stage further includes a resetting time period, and the method further includes, within the resetting time period, controlling, by the pull-up resetting sub-circuit, a second voltage input end to input a second voltage to the pull-up node under the control of a shift resetting end, so as to reset the potential at the pull-up node.

In still yet another aspect, the present disclosure provides in some embodiments a gate driving circuit including at least one level of the above-mentioned gate driving unit.

In still yet another aspect, the present disclosure provides in some embodiments a gate driving method for use in the above-mentioned gate driving circuit. Each driving period includes a touch stage, and the touch stage includes a maintenance time period and a voltage compensation time period. The gate driving method includes steps of: entering the touch stage after a corresponding gate driving signal is outputted by a shift register unit circuit of a current-level gate driving unit; performing a touch scanning operation at the touch stage; within the maintenance time period of the touch stage, maintaining, by a compensation circuit of a current-level gate driving unit, a potential at a pull-up node of the shift register unit circuit; and within the voltage compensation time period of the touch stage, charging, by the compensation circuit, a storage capacitor sub-circuit of the shift register unit circuit, so as to pull up the potential at the pull-up node.

In a possible embodiment of the present disclosure, each driving period includes a display stage subsequent to the voltage compensation time period. The gate driving method further includes: at the display stage, stopping the touch scanning operation; and within a first-row display time period of the display stage, outputting, by the shift register unit circuit, a corresponding gate driving signal again under the control of the pull-up node.

In a possible embodiment of the present disclosure, the gate driving method further includes enabling the gate driving circuit to start and end the touch stage through a shift clock signal line and a touch ending signal line.

In still yet another aspect, the present disclosure provides in some embodiments a display device including the above-mentioned gate driving circuit.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be TFTs, field effect transistors (FETs) or any other elements having an identical characteristic. In the embodiments of the present disclosure, in order to differentiate two electrodes other than a gate electrode from each other, one of them is called as first electrode and the other is called as second electrode. In actual use, the first electrode may be a drain electrode while the second electrode may be a source electrode, or the first electrode may be a source electrode while the second electrode may be a drain electrode.

Figure 1:
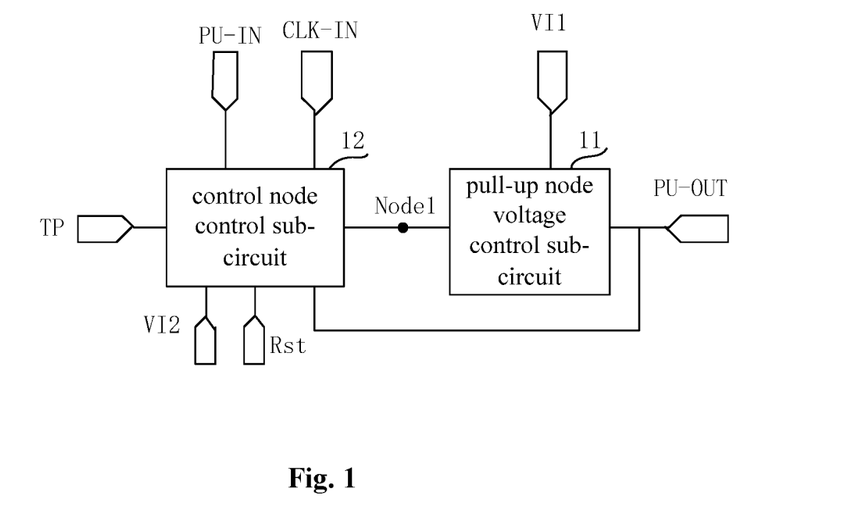
FIG. 1 is a block diagram of a compensation circuit according to one embodiment of the present disclosure.

The present disclosure provides in some embodiments a compensation circuit which, as shown in FIG. 1, includes a pull-up node voltage output end PU-OUT, a voltage compensation clock signal input end CLK-IN, a touch ending signal input end TP, a pull-up input end PU-IN and a voltage compensation resetting end Rst. The compensation circuit further includes: a pull-up node voltage control sub-circuit 11 connected to a first voltage input end VI1 a control node Node1 and the pull-up node voltage output end PU-OUT, and configured to control the first voltage input end VI1 to output a first voltage to the pull-up node voltage output end PU-OUT under the control of the control node Node1; and a control node control sub-circuit 12 connected to the voltage compensation clock signal input end CLK-IN, the touch ending signal input end TP, the pull-up input end PU-IN, the voltage compensation resetting end Rst, the pull-up node voltage output end PU-OUT, the control node Node1 and a second voltage input end VI2, and configured to control the voltage compensation clock signal input end CLK-IN to input a voltage compensation clock signal to the control node Node1 under the control of the pull-up input node PU-IN, control the second voltage input end VI2 to input a second voltage to the control node Node1 under the control of the voltage compensation resetting end Rst, and control the touch ending signal input end TP to input a touch ending signal to the control node Node1 under the control of the pull-up node voltage output end PU-OUT.

According to the compensation circuit in the embodiments of the present disclosure, it is able to control the potential at the pull-up node voltage output end PU-OUT under the control of the voltage compensation clock signal input end CLK-IN, the touch ending signal input end TP, the pull-up input end PU-IN and the voltage compensation resetting end Rst. As a result, it is able to pull up the potential at the pull-up node through the pull-up node voltage output end PU-OUT when a potential at a pull-up node of a gate driving unit is pulled down due to a touch stage or low-frequency output, thereby to enable the gate driving unit to output a corresponding gate driving signal normally and ensure a normal display effect.

In actual use, the first voltage may be a high voltage, and the second voltage may be a low voltage. However, the voltages may not be limited thereto.

In the embodiments of the present disclosure, the pull-up node voltage control sub-circuit 11 may control the first voltage input end VI1 to output the first voltage to the pull-up node voltage output end PU-OUT under the control of the control node Node1. To be specific, when the potential at the control node Node1 is within a first predetermined range (which may be set in accordance with the practical need), the pull-up node voltage control sub-circuit 11 may control the first voltage input end VI1 to output the first voltage to the pull-up node voltage output end PU-OUT. When the potential at the control node Node1 is not within the predetermined range, the pull-up node voltage control sub-circuit 11 may control the first voltage input end VI1 to be electrically disconnected from the pull-up node voltage output end PU-OUT.

The control node control sub-circuit 12 may control the voltage compensation clock signal input end CLK-IN to input the voltage compensation clock signal to the control node Node1 under the control of the pull-up input end PU-IN. To be specific, when the potential at the pull-up input end PU-IN is within a second predetermined range (which may be set in accordance with the practical need), the control node control sub-circuit 12 may control the voltage compensation clock signal input end CLK-IN to input the voltage compensation clock signal to the control node Node1. When the potential at the pull-up input end PU-IN is not within the second predetermined range, the control node control sub-circuit 12 may control the voltage compensation clock signal input end CLK-IN to be electrically disconnected from the control node Node1.

The control node control sub-circuit 12 may control the second voltage input end VI2 to input the second voltage to the control node Node1 under the control of the voltage compensation resetting end Rst. To be specific, when the potential at the voltage compensation resetting end Rst is within a third predetermined range (which may be set in accordance with the practical need), the control node control sub-circuit 12 may control the second voltage input end VI2 to input the second voltage to the control node Node1. When the potential at the voltage compensation resetting end Rst is not within the third predetermined range, the control node control sub-circuit 12 may control the second voltage input end VI2 to be electrically disconnected from the control node Node1.

The control node control sub-circuit 12 may control the touch ending signal input end TP to input the touch ending signal to the control node Node1 under the control of the pull-up node voltage output end PU-OUT. To be specific, when the potential at the pull-up node voltage output end PU-OUT is within a fourth predetermined range (which may be set in accordance with the practical need), the control node control sub-circuit 12 may control the touch ending signal input end TP to input the touch ending signal to the control node Node1. When the potential at the pull-up node voltage output end PU-OUT is not within the fourth predetermined range, the control node control sub-circuit 12 may control the touch ending signal input end TP to be electrically disconnected from the control node Node1.

To be specific, the pull-up node voltage control sub-circuit may include a first transistor, a gate electrode of which is connected to the control node, a first electrode of which is connected to the first voltage input end, and a second electrode of which is connected to the pull-up node voltage output end.

To be specific, the control node control sub-circuit may include: a second transistor, a gate electrode of which is connected to the pull-up input end, a first electrode of which is connected to the voltage compensation clock signal input end, and a second electrode of which is connected to the control node; a third transistor, a gate electrode of which is connected to the pull-up node voltage output end, and a second electrode of which is connected to the control node; and a fourth transistor, a gate electrode of which is connected to the voltage compensation resetting end, a first electrode of which is connected to the control node, and a second electrode of which is connected to the second voltage input end.

To be specific, the compensation circuit may further include a fifth transistor. A first electrode of the third transistor is connected to the touch ending signal input end via the fifth transistor, a gate electrode and a first electrode of the fifth transistor are connected to the touch ending signal input end, and a second electrode of the fifth transistor is connected to the first electrode of the third transistor.

The compensation circuit will be described hereinafter in conjunction with the embodiments.

Figure 2:
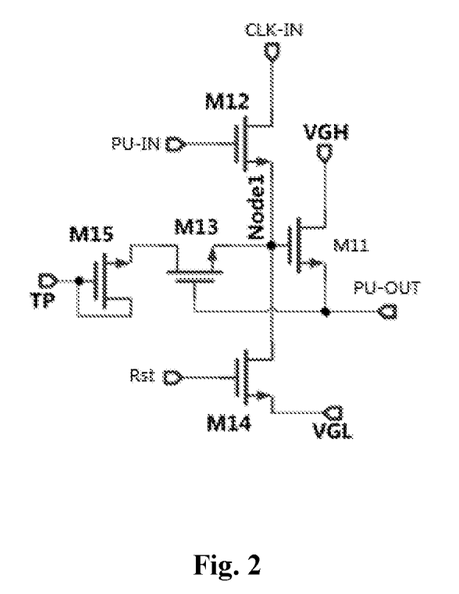
FIG. 2 is a circuit diagram of the compensation circuit according to one embodiment of the present disclosure.

As shown in FIG. 2, the compensation circuit includes the pull-up node voltage control sub-circuit and the control node control sub-circuit.

The pull-up node voltage control sub-circuit includes a first transistor M11, a gate electrode of which is connected to the control node Node1, a drain electrode of which is connected to a high voltage input end for inputting a high voltage VGH, and a source electrode of which is connected to the pull-up node voltage output end PU-OUT.

The control node control sub-circuit includes: a second transistor M12, a gate electrode of which is connected to the pull-up input end PU-IN, a drain electrode of which is connected to the voltage compensation clock signal input end CLK-IN, and a source electrode of which is connected to the control node Node1; a third transistor M13, a gate electrode of which is connected to the pull-up node voltage output end PU-OUT, and a source electrode of which is connected to the control node Node1; a fourth transistor M14, a gate electrode of which is connected to the voltage compensation resetting end Rst, a drain electrode of which is connected to the control node Node1, and a source electrode of which is connected to a low voltage input end for inputting a low voltage VGL; and a fifth transistor M15, a gate electrode and a drain electrode of which are connected to the touch ending signal input end TP, and a source electrode of which is connected to a drain electrode of the third transistor M13.

In the compensation circuit in FIG. 2, the transistors are n-type transistors. However, in actual use, the transistors may also be p-type transistors, i.e., the types of the transistors will not be particularly defined herein.

In actual use, Rst may be a gate driving signal output end of a shift register unit circuit whose pull-up node is connected to the pull-up node voltage output end of the compensation circuit.

During the operation of the compensation circuit in FIG. 2, within a second last display time period tdll of a first display stage TD1, the potential at PU-IN is a high level, a high level is applied to CLK-IN, a low level is applied to TP, and a low level is applied to Rst, so M12 is turned on, and Node1 is charged by CLK-IN. M15 is turned off, and the potential at Node1 is changed to a high level. M11 is turned on, so as to pull up the potential at PU-OUT.

Within a last time period td12 of the first display stage TD1, a clock signal applied to CLK-IN is changed from a high level to a low level. When the potential at PU-IN is not pulled down to a low level yet or the voltage applied to PU-IN is relatively large (depending on a duty ratio of the clock signal applied to CLK-IN), the potential at Node1 is changed to a low level, so M11 stops charging PU-OUT. After Rst (i.e., the gate driving signal output end of the shift register unit circuit) has outputted a high level, the potential at Node1 is reset again, so as to prevent M11 from being turned on again within the display time period.

A touch stage TTC is started subsequent to the first display stage TD1, and it includes a maintenance time period ttc1 and a voltage compensation time period ttc2.

At the touch stage TTC, Rst (i.e., the gate driving signal output end of the shift register unit circuit) outputs a low level, so as to turn off M14.

Within the maintenance time period ttc1, a low level is applied to TP, a low level is applied to CLK-IN, and a high level is applied to PU-IN, so M12 is turned on. A low level is applied to Node1, so M11 is turned off. The potential at PU-OUT is not adversely affected by the compensation circuit in FIG. 2, i.e., the potential at PU-OUT is a high level.

Within the voltage compensation time period ttc2, a high level is applied to TP, and the potential at PU-OUT is a high level, so M15 and M13 are turned on, so as to enable the potential at Node1 to be a high level. M11 is turned on, so as to charge PU-OUT through the high voltage input end for inputting VGH. The potential at PU-OUT is pulled up after a Long H Blank (LHB) time period (i.e., a duration of the touch stage between two adjacent display stages).

A second display stage TD2 is started subsequent to the touch stage TTC. At the second display stage TD2, the shift register unit circuit outputs a corresponding gate driving signal through its gate driving signal output end, and then the remaining gate driving units are enabled sequentially.

The present disclosure further provides in some embodiments a gate driving unit including a shift register unit circuit and the above-mentioned compensation circuit.

Figure 3:
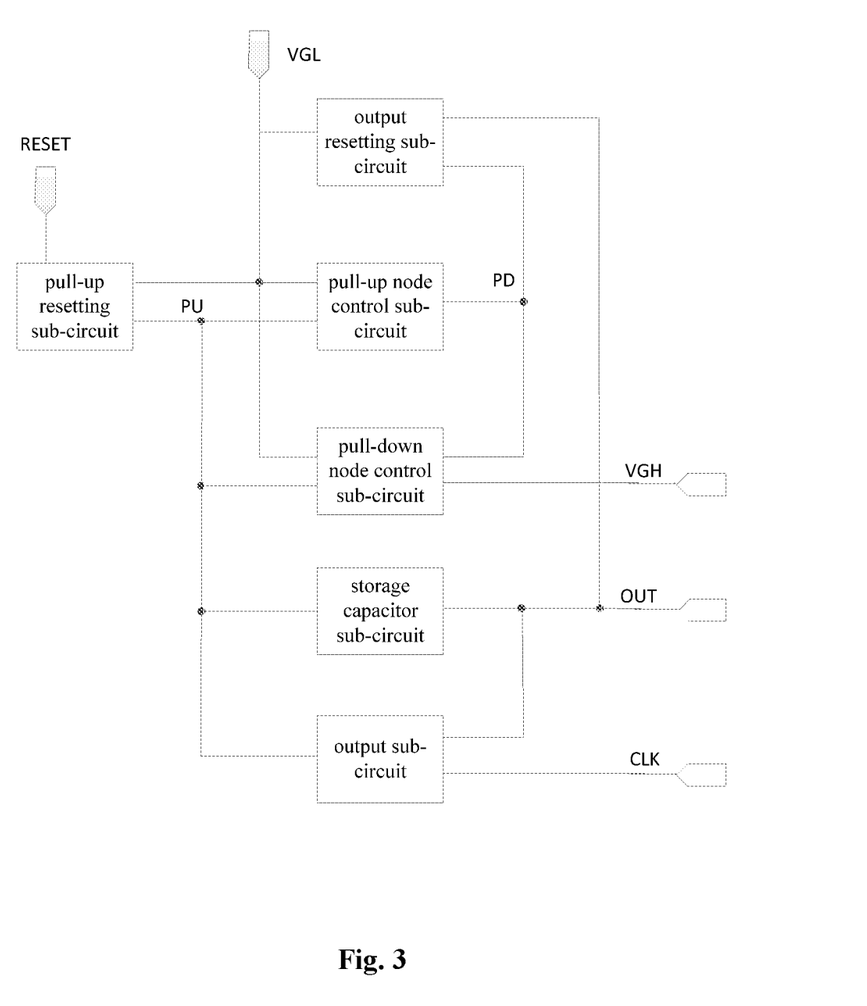
FIG. 3 is a schematic view showing a shift register unit circuit according to one embodiment of the present disclosure.

As shown in FIG. 3, the shift register unit circuit includes a shift resetting end RESET, a shift clock signal input end CLK, a pull-up node PU, a pull-down node PD, a gate driving signal output end OUTPUT, a pull-up resetting sub-circuit, a pull-up node control sub-circuit, a pull-down node control sub-circuit, a storage capacitor sub-circuit, an output sub-circuit and an output resetting sub-circuit. The pull-up node is connected to a pull-up node voltage output end of the compensation circuit. A pull-up input end of the compensation circuit is connected to a pull-up node of a previous-level gate driving unit. A voltage compensation clock signal input end of the compensation circuit is connected to a voltage compensation clock signal line for outputting a voltage compensation clock signal. A voltage compensation resetting end of the compensation circuit is connected to the gate driving signal output end. A touch ending signal input end of the compensation circuit is connected to a touch ending signal line. The shift clock signal input end is connected to a shift clock signal line for outputting a shift clock signal. The pull-up resetting sub-circuit is connected to the shift resetting end, a third voltage input end VGL and the pull-up node, and configured to control the third voltage input end to input a third voltage to the pull-up node under the control of the shift resetting end. The pull-up node control sub-circuit is connected to the pull-up node, the pull-down node and the third voltage input end, and configured to control the third voltage input end to input the third voltage to the pull-up node under the control of the pull-down node. The pull-down node control sub-circuit is connected to the pull-up node, the pull-down node, a fourth voltage input end VGH and the third voltage input end, and configured to control a potential at the pull-down node under the control of the pull-up node. A first end of the storage capacitor sub-circuit is connected to the pull-up node, and a second end thereof is connected to the gate driving signal output end. The output sub-circuit is connected to the gate driving signal output end, the pull-up node and the shift clock signal input end, and configured to control the shift clock signal input end to input a shift clock signal to the gate driving signal output end under the control of the pull-up node. The output resetting sub-circuit is connected to the gate driving signal output end, the pull-down node and the third voltage input end, and configured to control the third voltage input end to output the third voltage to the gate driving signal output end under the control of the pull-down node.

In actual use, the third voltage may be a low voltage, and the fourth voltage may be a high voltage. However, the voltages may not be limited thereto.

The gate driving unit in the embodiments of the present disclosure differs from a conventional gate driving unit in that an input sub-circuit of the conventional gate driving units is not contained in the gate driving unit in the embodiments of the present disclosure.

In the conventional gate driving unit, the input sub-circuit is connected to a pull-up node, a high voltage input end and an input end, and configured to pull up a potential at the pull-up node at an input stage under the control of the input end. In the gate driving unit in the embodiments of the present disclosure, the compensation circuit is adopted, so as to pull up the potential at the pull-up node within the input time period of the display stage.

For the gate driving unit in the embodiments of the present disclosure, the pull-up node voltage output end of the compensation circuit is connected to the pull-up node of the shift register unit, the pull-up input end of the compensation circuit is connected to a pull-up node of a previous-level gate driving unit, and the voltage compensation resetting end of the compensation circuit is connected to the gate driving signal output end of the shift register unit circuit.

The present disclosure further provides in some embodiments a method for driving the above-mentioned gate driving unit, including a step of controlling, by a compensation circuit, a potential at a pull-up node voltage output end under the control of a voltage compensation clock signal input end, a touch ending signal input end, a pull-up input end and a voltage compensation resetting end, so as to control a potential at a pull-up node of a shift register unit circuit of the gate driving unit.

According to the method in the embodiments of the present disclosure, the potential at the pull-up node voltage output end is controlled by the compensation circuit, so as to control the potential at the pull-up node of the shift register unit circuit of the gate driving unit. As a result, it is able to pull up the potential at the pull-up node through the pull-up node voltage output end when the potential at the pull-up node of the gate driving unit is pulled down due to a touch stage or low-frequency output, thereby to enable the gate driving unit to output a corresponding gate driving signal normally and ensure a normal display effect.

In actual use, the method includes: within an input time period of each display stage, controlling, by a control node control sub-circuit, the voltage compensation clock signal input end to input a voltage compensation clock signal to a control node under the control of a pull-up node of a previous-level gate driving unit, and controlling, by a pull-up node voltage control sub-circuit, a first voltage input end to input a first voltage to the pull-up node voltage output end, under the control of the control node, so as to pull-up a potential at the pull-up node; and within an output time period of each display stage, controlling, by the shift register unit circuit, the gate driving signal output end to output a corresponding gate driving signal under the control of the pull-up node.

Different from the conventional gate driving unit, in the embodiments of the present disclosure, the potential at the pull-up node is pulled up through the compensation circuit rather than the input sub-circuit, within the input time period of the display stage.

During the implementation, the display stage may further include a resetting time period, and the method further includes, within the resetting time period, controlling, by the pull-up resetting sub-circuit, a second voltage input end to input a second voltage to the pull-up node under the control of a shift resetting end, so as to reset the potential at the pull-up node.

The present disclosure further provides in some embodiments a gate driving circuit including at least one level of the above-mentioned gate driving unit.

In a possible embodiment of the present disclosure, for the gate driving circuit, merely a level gate driving unit that finally outputs the corresponding gate driving signal from the display state to the touch stage may be set as the above-mentioned gate driving unit, and the other gate driving units may be of a structure identical to the conventional gate driving unit.

In another possible embodiment of the present disclosure, each of the gate driving units of the gate driving circuit may be set as the above-mentioned gate driving unit, and the touch ending signal and the shift clock signal may be changed so as to perform a touch operation after the gate driving unit in any row has outputted the corresponding gate driving signal, and meanwhile ensure an output effect of the gate driving signal.

The gate driving circuit will be described hereinafter in conjunction with two embodiments.

In a first embodiment, the gate driving circuit includes a plurality of levels of gate driving units.

Figure 4:
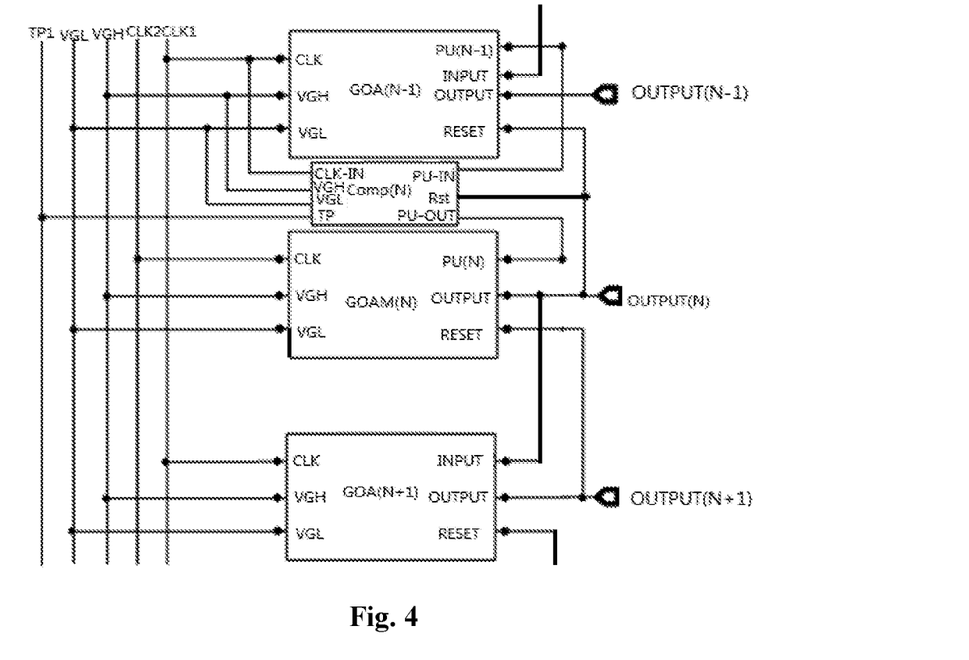
FIG. 4 is a schematic view showing a gate driving circuit according to a first embodiment of the present disclosure.

As shown in FIG. 4, the gate driving circuit includes three levels of gate driving units, i.e., an $(N-1)^{th}$-level gate driving unit GOA(N−1), an $N^{th}$-level gate driving unit GOAM(N), and an $(N+1)^{th}$-level gate driving unit GOA(N+1), where N is a positive integer greater than 1. GOA(N−1) and GOA(N+1) are both conventional gate driving units, and GOAM(N) is the above-mentioned gate driving unit.

The $N^{th}$-level gate driving unit includes an $N^{th}$-level shift register unit circuit GOAM(N) and an $N^{th}$-level compensation circuit Comp(N). For GOA(N−1), GOA(N+1) and GOAM(N), OUTPUT represents the gate driving signal output end, RESET represents the shift resetting end, and CLK represents the shift clock signal input end.

In FIG. 4, VGH represents a high voltage, VGL represents a low voltage, PU(N−1) represents a pull-up node of GOA(N−1), and PU(N) represents a pull-up node of GOAM(N). For GOA(N−1) and GOA(N+1), INPUT represents the input end. For Comp(N), CLK-IN represents the voltage compensation clock signal input end, PU-IN represents the pull-up input end, PU-OUT represents the pull-up node voltage output end, TP represents the touch ending signal input end, and Rst represents the voltage compensation resetting end.

In FIG. 4, OUTPUT(N−1) represents an $(N-1)^{th}$-level gate driving signal output end, OUTPUT(N) represents an $N^{th}$-level gate driving signal output end, OUTPUT(N+1) represents an (N+1)-level gate driving signal output end, TP1 represents a first touch ending signal line, CLK1 represents a first clock signal line, and CLK2 represents a second clock signal line.

As shown in FIG. 4, PU-IN is connected to the pull-up node of GOA(N−1), PU-OUT is connected to PU(N) of GOAM(N), and TP is connected to TP1. The shift clock signal input end of GOA(N−1) is connected to CLK1, the shift clock signal input end of GOAM(N) is connected to CLK2, and the shift clock signal input end of GOA(N+1) is connected to CLK1. CLK-IN of Comp(N) is connected to CLK1, and Rst of Comp(N) is connected to OUTPUT(N).

In FIG. 4, OUTPUT(N) is connected to the input end INPUT of GOA(N+1), and OUTPUT(N) is connected to the shift resetting end RESET of GOA(N−1).

The compensation circuit Comp(N) has a structure as shown in FIG. 2, and the shift register unit circuit has a structure as shown in FIG. 3.

Figure 5:
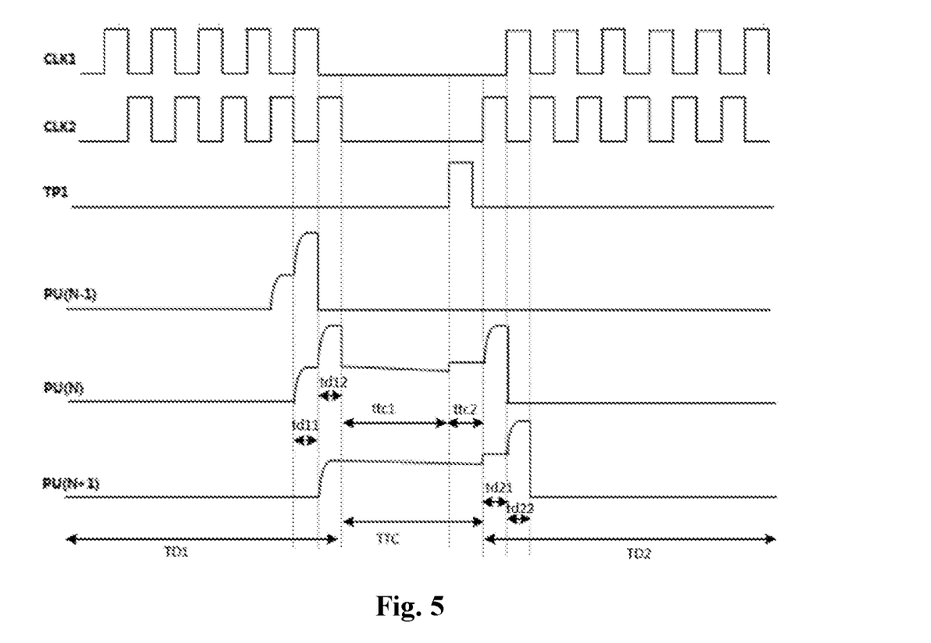
FIG. 5 is a sequence diagram of the gate driving circuit according to the first embodiment of the present disclosure.

As shown in FIG. 5, during the operation of the gate driving circuit in FIG. 4 (in FIG. 5, PU(N+1) represents a pull-up node of GOA(N+1), within a second last display time period tdl1 of a first display stage TD1, a high level is applied to CLK1, a low level is applied to CLK2, a low level is applied to TP1, and the potential at PU(N−1) is a high level, so M12 of Comp(N) is turned on and the control node Node1 of Comp(N) is charged via the high-level signal applied to CLK1. At this time, because the low level is applied to TP1, M15 of Comp(N) is turned off, and the potential at Node1 is changed to a high level. M11 is turned on, so as to pull up the potential at PU(N).

Within a last display time period of td12 of the first display stage TD1, a high level is applied to CLK2, the first clock signal applied to CLK1 is changed from a high level to a low level, and the potential at PU(N−1) is not pulled down yet or relatively large (depending on the duty ratio of the first clock signal), so the potential at Node1 is changed to a low level. At this time, M11 is turned off and stops charging PU(N). After OUTPUT(N) outputs a high level, the potential at Node1 is reset again, so as to prevent M11 from being turned on again. Because OUTPUT(N) outputs a high level, the potential at PU(N+1) is pulled up by OUTPUT(N), and the potential at PU(N−1) is reset by OUTPUT(N), so the potential at PU(N−1) is a low level. In addition, because OUTPUT(N) outputs a high level, M14 of Comp(N) is turned on, and the potential at Node1 is changed to a low level.

At the touch stage TTC subsequent to td12, a touch scanning operation is performed, and a gate driving scanning operation is stopped. The touch stage TTC includes a maintenance time period ttc1 and a voltage compensation time period ttc2.

At TTC, a low level is applied to each of CLK1 and CLK2. Within ttc1, a low level is applied to TP1.

Within the maintenance time period ttc1, because the low level is applied to each of CLK1 and CLK2, each of OUTPUT(N) and OUTPUT(N+1) outputs a low level, and M14 of Comp(N) is turned off. In addition, because the low level is applied to TP1, M15 of Comp(N) is turned off. At this time, the potential at Node1 is maintained as a low level, so M11 is turned off, and the potential at PU(N) is not adversely affected by Comp(N).

Within the voltage compensation time period ttc2, a high level (square wave) is applied to TP1, so M15 of Comp(N) is turned on. Because the potential at PU(N) is a high level, M13 is turned too, so as to change the potential at Node1 to a high level. M11 is turned on so as to charge PU(N). At this time, the potential at PU(N) is pulled up after an LHB time period.

Within a first display time period td21 of a second display stage TD2 subsequent to ttc2, the second clock signal from CLK2 is changed to a high level, so as to enable GOAM(N) again. At this time, OUTPUT(N) outputs a high level, and a high level is applied to the input end of GOA(N+1), so as to pull up the potential at PU(N+1). Within a second display time period td21 of TD2, the potential at PU(N+1) is bootstrapped, so OUTPUT(N+1) outputs the corresponding gate driving signal. Within the remaining display time period of TD2, the gate driving units are turned on sequentially. At this time, it is able to ensure a display effect of a display panel when a proper data signal is applied.

For the gate driving circuit in FIG. 4, two clock signal lines are adopted, i.e., CLK1 and CLK2. CLK1 is connected to GOA(N−1), GOA(N+1) and Comp(N), and CLK2 is connected to GOAM(N), as shown in FIG. 5. At the first display stage TD1 and the second display stage TD2, the first clock signal applied to CLK1 has a phase opposite to the second clock signal applied to CLK2.

In actual use, the gate driving circuit in the embodiments of the present disclosure may be connected to 2n clock signal lines, where n is positive integer, e.g., 1, 2, 3 or 4.

In FIG. 5, the first clock signal applied to CLK1 is maintained at a high level for one clock period H, and it has a duty ratio of 1/2 at the display stage.

When n=2, the gate driving circuit is connected to the first clock signal line, the second clock signal line, a third clock signal line and a fourth clock signal line. At this time, GOA(N−1) may be connected to the first clock signal line, GOAM(N) may be connected to the second clock signal line, GOA(N+1) may be connected to the third clock signal line, and the (N+2)$^{th}$-level gate driving unit may be connected to the fourth clock signal line. The clock signals may be maintained at a high level or a low level for 2 H, and a current clock signal is delayed by 1 H as compared with a previous clock signal.

In actual use, the gate driving circuit may include at least two of the above-mentioned gate driving units.

Figure 6:
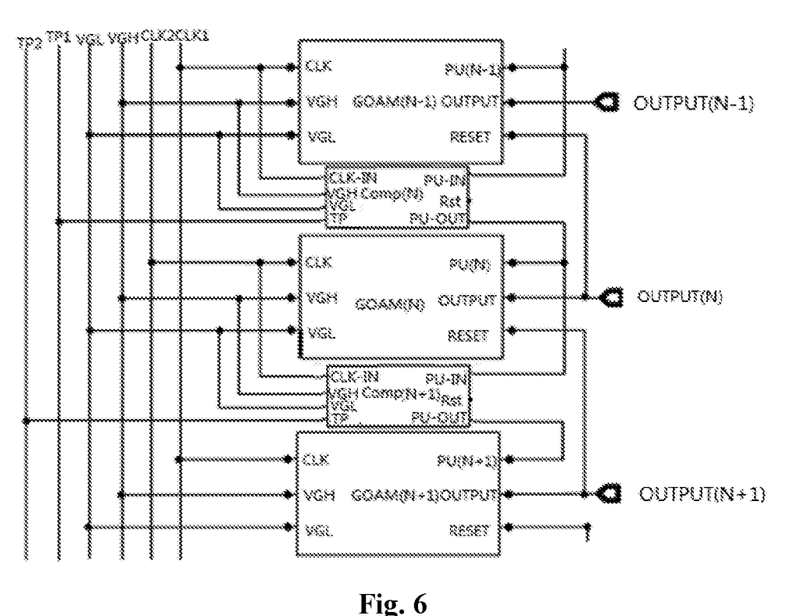
FIG. 6 is a schematic view showing the gate driving circuit according to a second embodiment of the present disclosure.

As shown in FIG. 6, in a second embodiment, each gate driving unit of the gate driving circuit is the above-mentioned gate driving unit.

In FIG. 6, the gate driving circuit includes three levels of gate driving units, i.e., an (N−1)$^{th}$-level gate driving unit, an N$^{th}$-level gate driving unit, and an (N+1)$^{th}$-level gate driving unit, where N is an integer greater than 1.

The (N−1)$^{th}$-level gate driving unit includes an (N−1)$^{th}$-level shift register unit circuit (not shown) and an (N−1)$^{th}$-level compensation circuit Comp(N−1). The N$^{th}$-level gate driving unit includes an N$^{th}$-level shift register unit circuit GOAM(N) and an N$^{th}$-level compensation circuit Comp(N). The (N+1)$^{th}$-level gate driving unit includes an (N+1)$^{th}$-level shift register unit circuit GOAM(N+1) and an (N+1)$^{th}$-level compensation circuit Comp(N+1).

Each shift register unit circuit includes the pull-up node PU, the gate driving signal output end OUTPUT, the shift clock signal input end CLK, and the shift resetting end RESET. Each compensation circuit includes the voltage compensation clock signal input end CLK-IN, the pull-up input end PU-IN, the pull-up node voltage output end PU-OUT, the touch ending signal input end TP and the voltage compensation resetting end Rst.

In FIG. 6, VGH represents a high voltage, VGL represents a low voltage, PU(N−1) represents a pull-up node of GOAM (N−1), PU(N) represents a pull-up node of GOAM(N), PU(N+1) represents a pull-up node of GOAM(N+1), OUTPUT(N−1) represents an (N−1)$^{th}$-level gate driving signal output end, OUTPUT(N) represents an N$^{th}$-level gate driving signal output end, OUTPUT(N+1) represents an (N+1)$^{th}$-level gate driving signal output end, TP1 represents a first touch ending signal line, TP2 represents a second touch ending signal line, CLK1 represents a first clock signal line and CLK2 represents a second clock signal line.

A shift clock signal line of GOAM(N−1) is connected to CLK1, and a shift resetting end of GOAM(N−1) is connected to OUTPUT(N). A pull-up input end of Comp(N) is connected to PU(N−1), a pull-up node voltage output end thereof is connected to PU(N), a voltage compensation clock signal input end of Comp(N) is connected to CLK1, a touch ending signal input end of Comp(N) is connected to TP1, and a voltage compensation resetting end of Comp(N) is connected to OUPUT(N). A shift resetting end of GOAM(N) is connected to OUTPUT(N+1), and a shift clock signal input end thereof is connected to CLK2. A pull-up input end of Comp(N+1) is connected to PU(N), a voltage compensation clock signal input end thereof is connected to CLK2, a pull-up node voltage output end thereof is connected to PU(N+1), a voltage compensation resetting end thereof is connected to OUTPUT(N+1), and a touch ending signal input end thereof is connected to TP2. A shift clock signal input end of GOAM(N+1) is connected to CLK1.

For the gate driving circuit in FIG. 6, each compensation circuit has a structure as shown in FIG. 2.

During the operation of the gate driving circuit in FIG. 6, a wave form of the shift clock signal applied to the shift clock signal line (i.e., a clock signal line connected to the shift clock signal input end CLK-IN) and a wave form of the touch ending signal applied to the touch ending signal line may be changed, so as to determine a time point when the touch operation is performed.

Figure 7:
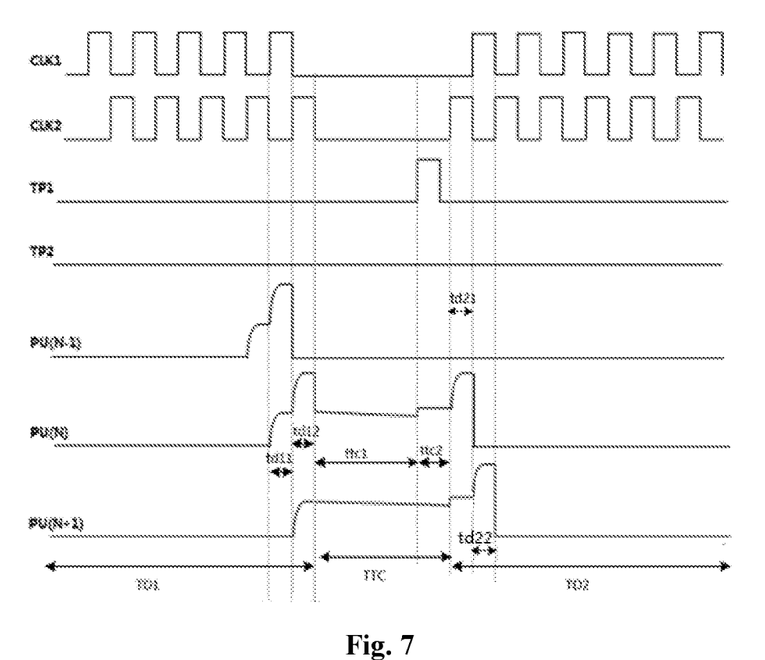
FIG. 7 is a sequence diagram of the gate driving circuit according to the second embodiment of the present disclosure.

As shown in FIG. 7, after a corresponding gate driving signal has been outputted from GOAM(N), a potential of a second clock signal applied to CLK2 connected to the shift clock signal input end of GOAM(N), a potential of a first cock signal applied to CLK1 connected to the shift clock signal input end of COA(N+1), a potential at the first touch ending signal line TP1 connected to the touch ending signal input end of Comp(N) and a potential at the second touch ending signal ling TP2 connected to the touch ending signal input end of Comp(N+1) may be each set as a low level, so as to perform the touch operation immediately subsequent to the display stage.

When the touch stage is about to be ended, the potential at TP1 may be set as a high level, so as to pull up the potential at PU(N) through the compensation circuit, thereby to enable the GOAM(N) to output the corresponding gate driving signal normally at a next display stage, and prevent the occurrence of display abnormality when potential at PU(N) is pulled down at the touch stage. At the next display stage, each shift clock signal line may output the corresponding clock signal normally, and each touch ending signal line may output a low level.

As shown in FIG. 7, during the operation of the gate driving circuit in FIG. 6, within the second last display time period tdll of the first display stage TD1, a high level is applied to CLK1, a low level is applied to CLK2, a low level is applied to each of TP1 and TP2, and the potential at PU(N−1) is a high level, so M12 of Comp(N) is turned on, and Node1 of Comp(N) is charged via the high-level signal from CLK1. At this time, because the low level is applied to TP1, M15 of Comp(N) is turned off, the potential at Node1 is changed to a high level, and M11 is turned on, so as to pull up the potential at PU(N).

Within a last display time period td12 of the first display stage TD1, a high level is applied to CLK2, the first clock signal applied to CLK1 is changed from a high level to a low level, and the potential at PU(N−1) is not pulled down yet or relatively large (depending on the duty ratio of the first clock signal), so the potential at Node1 is changed to a low level. At this time, M11 is turned off and stops charging PU(N). After OUTPUT(N) outputs a high level, the potential at Node1 is reset again, so as to prevent M11 from being turned on again. Because OUTPTU(N) outputs a high level, the potential at PU(N+1) is pulled up by OUTPUT(N), and the potential at PU(N−1) is reset by OUTPUT(N), so the potential at PU(N−1) is a low level. In addition, because OUTPUT(N) outputs a high level, M14 of Comp(N) is turned on, and the potential at Node1 is changed to a low level.

At the touch stage TTC subsequent to td12, a scanning operation is performed, and a gate driving scanning operation is stopped.

The touch stage TTC includes the maintenance time period ttc1, and the voltage compensation time period ttc2.

At TTC, a lower level is applied to each of CLK1, CLK2 and TP2. Within ttc1, a low level is applied to TP1. Within the maintained time period ttc1, because the low level is applied to each of CLK1 and CLK2, each of OUTPUT(N) and OUTPUT(N+1) outputs a low level, and M14 of Comp(N) is turned off. In addition, because the low level is applied to TP1, M15 of Comp(N) is turned off. At this time, the potential at Node1 is maintained as a low level, M11 is turned off, and the potential at PU(N) is not affected by Comp(N).

Within the voltage compensation time period ttc2, a high level (square wave) is applied to TP1, so M15 of Comp(N) is turned on. Because the potential at PU(N) is a high level, M13 is also turned on, so as to enable the potential at Node1 to be a high level. M11 is turned on so as to charge PU(N). At this time, the potential at PU(N) is pulled up after an LHB time period.

Within the first display time period td21 of the second display stage TD2 subsequent to ttc2, the second clock signal applied to CLK2 is changed to be at a high level. At this time, GOAM(N) is enabled again, OUTPTU(N) outputs a high level, and M12 of Comp(N+1) is turned on. Because the high level is applied to CLK2, the potential at Node1 of Comp(N+1) is a high level. At this time, M11 of Comp(N+1) is turned on, so as to apply VGH to PU(N+1) and pull up the potential at PU(N+1).

Within the second display time period t22 of TD2, the potential at PU(N+1) is bootstrapped, and OUTPUT(N+1) outputs the corresponding gate driving signal. Within the remaining display time period of TD2, the gate driving units are turned on sequentially. At this time, it is able to ensure the display effect of the display panel when the proper data signal is applied.

According to the gate driving circuit in the second embodiment of the present disclosure, through providing the newly-added compensation circuit, optimizing a cascading mode of the GOA units and changing a sequence of the clock signals, it is able for OUTPUT(N) of the gate driving circuit to output the gate driving signal, so as to perform the scanning operation from an $N^{th}$ gate line, thereby to enable the touch driving circuit to output the gate driving signal normally after the touch operation. In addition, through changing a wave form of the touch ending signal from the touch ending signal line and a wave form of the shift clock signal from the shift clock signal line as well as providing the corresponding data signal, it is able to perform a touch operation after a scanning operation made by each gate driving unit is finished, and meanwhile ensure an output effect of the gate driving signal.

For the gate driving circuit in FIG. 6, two clock signal lines are adopted, i.e., CLK1 and CLK2. CLK1 is connected to GOAM(N−1) and GOAM(N+1), and CLK2 is connected to GOAM(N) and Comp(N), as shown in FIG. 7. At the first display stage TD1 and the second display stage TD2, a first clock signal applied to CLK1 has a phase opposite to a second clock signal applied to CLK2.

In actual use, the gate driving circuit in the embodiments of the present disclosure may be connected to 2n clock signal lines, where n is positive integer, e.g., 1, 2, 3 or 4.

In FIG. 7, the first clock signal applied to CLK1 is maintained at a high level for one clock period H, and it has a duty ratio of 1/2 at the display stage.

When n=2, the gate driving circuit is connected to the first clock signal line, the second clock signal line, a third clock signal line and a fourth clock signal line. At this time, GOAM(N−1) may be connected to the first clock signal line, GOAM(N) may be connected to the second clock signal line, GOAM(N+1) may be connected to the third clock signal line, and the (N+2)$^{th}$-level gate driving unit may be connected to the fourth clock signal line. The clock signals may be maintained at a high level or a low level for 2 H, and a current clock signal is delayed by 1 H as compared with a previous clock signal.

In actual use, for the gate driving circuit in the second embodiment of the present disclosure, when 2n clock signal lines are adopted, 2n touch ending signal lines may be adopted too. The 2n clock signal lines may be connected to the shift clock signal input ends of the adjacent 2n levels of shift register unit circuit respectively, and one touch ending signal line corresponds to one clock signal line. The 2n clock signal lines may be further connected to the touch ending signal input ends of the adjacent 2n levels of compensation circuits respectively. When it is necessary to apply a high level to the touch ending signal input end of a certain compensation circuit so as to pull up the potential at the corresponding pull-up node, a low level may be applied to each of the other touch ending signal lines, so as to prevent the potential at the pull-up node of any other shift register unit circuit from being pulled up by mistake, thereby to ensure the display effect.

The present disclosure further provides in some embodiments a gate driving method for use in the above-mentioned gate driving circuit. Each driving period includes a touch stage, and the touch stage includes a maintenance time period and a voltage compensation time period. The gate driving method includes steps of: entering the touch stage after a corresponding gate driving signal is outputted by a shift register unit circuit of a current-level gate driving unit; performing a touch scanning operation at the touch stage; within the maintenance time period of the touch stage, maintaining, by a compensation circuit of the current-level gate driving unit, a potential at a pull-up node of the shift register unit circuit; and within the voltage compensation time period of the touch stage, charging, by the compensation circuit, a storage capacitor sub-circuit of the shift register unit circuit, so as to pull up the potential at the pull-up node, so as to pull up the potential at the pull-up node through the pull-up node voltage output end of the compensation circuit even if the potential at the pull-up node of the gate driving unit is pulled down due to the touch stage or the low-frequency output, thereby to enable the gate driving unit to output the corresponding gate driving signal normally and prevent the display effect from being adversely affected.

During the implementation, each driving period includes a display stage subsequent to the voltage compensation time period. The gate driving method further includes: at the display stage, stopping the touch scanning operation; and within a first-row display time period of the display stage, outputting, by the shift register unit circuit, a corresponding gate driving signal again under the control of the pull-up node.

To be specific, the gate driving method further includes enabling the gate driving circuit to start and end the touch stage through a shift clock signal line and a touch ending signal line.

According to the gate driving method in the embodiments of the present disclosure, through changing a wave form of the touch ending signal from the touch ending signal line and a wave form of the shift clock signal from the shift clock signal line as well as providing the corresponding data signal, it is able to insert a touch signal after a scanning operation made by any row of gate driving unit, start the next display stage subsequent to the touch stage, and ensure an output effect of the gate driving signal.

The present disclosure further provides in some embodiments a display device including the above-mentioned gate driving circuit.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A gate driving unit comprising a shift register unit circuit and a compensation circuit, wherein the compensation circuit comprises a pull-up node voltage output end, a voltage compensation clock signal input end, a touch ending signal input end, a pull-up input end and a voltage compensation resetting end, wherein the compensation circuit further comprises:

a pull-up node voltage control sub-circuit connected to a first voltage input end, a control node and the pull-up node voltage output end, and configured to control the first voltage input end to output a first voltage to the pull-up node voltage output end under the control of the control node; and a control node control sub-circuit connected to the voltage compensation clock signal input end, the touch ending signal input end, the pull-up input end, the voltage compensation resetting end, the pull-up node voltage output end, the control node and a second voltage input end, and configured to control the voltage compensation clock signal input end to input a voltage compensation clock signal to the control node under the control of the pull-up input end, control the second voltage input end to input a second voltage to the control node under the control of the voltage compensation resetting end, and control the touch ending signal input end to input a touch ending signal to the control node under the control of the pull-up node voltage output end, wherein the shift register unit circuit comprises a shift resetting end, a shift clock signal input end, a pull-up node, a pull-down node, a gate driving signal output end, a pull-up resetting sub-circuit, a pull-up node control sub-circuit, a pull-down node control sub-circuit, a storage capacitor sub-circuit, an output sub-circuit and an output resetting sub-circuit;

the pull-up node is connected to a pull-up node voltage output end of the compensation circuit;

a pull-up input end of the compensation circuit is connected to a pull-up node of a previous-level gate driving unit;

a voltage compensation clock signal input end of the compensation circuit is connected to a voltage compensation clock signal line for outputting a voltage compensation clock signal;

a voltage compensation resetting end of the compensation circuit is connected to the gate driving signal output end;

a touch ending signal input end of the compensation circuit is connected to a touch ending signal line;

the shift clock signal input end is connected to a shift clock signal line for outputting a shift clock signal;

the pull-up resetting sub-circuit is connected to the shift resetting end, a third voltage input end and the pull-up node, and configured to control the third voltage input end to input a third voltage to the pull-up node under the control of the shift resetting end;

the pull-up node control sub-circuit is connected to the pull-up node, the pull-down node and the third voltage input end, and configured to control the third voltage input end to input the third voltage to the pull-up node under the control of the pull-down node;

the pull-down node control sub-circuit is connected to the pull-up node, the pull-down node, a fourth voltage input end and the third voltage input end, and configured to control a potential at the pull-down node under the control of the pull-up node;

a first end of the storage capacitor sub-circuit is connected to the pull-up node, and a second end of the storage capacitor sub-circuit is connected to the gate driving signal output end;

the output sub-circuit is connected to the gate driving signal output end, the pull-up node and the shift clock signal input end, and configured to control the shift clock signal input end to input a shift clock signal to the gate driving signal output end under the control of the pull-up node; and the output resetting sub-circuit is connected to the gate driving signal output end, the pull-down node and the third voltage input end, and configured to control the third voltage input end to output the third voltage to the gate driving signal output end under the control of the pull-down node.

2. The gate driving unit according to claim 1, wherein the third voltage is a low voltage, and a fourth voltage from the fourth voltage input end is a high voltage.

3. A method for driving the gate driving unit according to claim 1, comprising a step of controlling, by a compensation circuit, a potential at a pull-up node voltage output end under the control of a voltage compensation clock signal input end, a touch ending signal input end, a pull-up input end and a voltage compensation resetting end, so as to control a potential at a pull-up node of a shift register unit circuit of the gate driving unit.

4. The method according to claim 3, comprising:
within an input time period of each display stage, controlling, by a control node control sub-circuit, the voltage compensation clock signal input end to input a voltage compensation clock signal to a control node under the control of a pull-up node of a previous-level gate driving unit, and controlling, by a pull-up node voltage control sub-circuit, a first voltage input end to input a first voltage to the pull-up node voltage output end, under the control of the control node, so as to pull-up a potential at the pull-up node; and within an output time period of each display stage, controlling, by the shift register unit circuit, the gate driving signal output end to output a corresponding gate driving signal under the control of the pull-up node.

5. The method according to claim 4, wherein each display stage further comprises a resetting time period, and the method further comprises, within the resetting time period, controlling, by the pull-up resetting sub-circuit, a second voltage input end to input a second voltage to the pull-up node under the control of a shift resetting end, so as to reset the potential at the pull-up node.

6. A gate driving circuit, comprising at least one level of the gate driving unit according to claim 1.

7. A gate driving method for use in the gate driving circuit according to claim 6, wherein each driving period comprises a touch stage, and the touch stage comprises a maintenance time period and a voltage compensation time period,
wherein the gate driving method comprises steps of:
entering the touch stage after a corresponding gate driving signal is outputted by a shift register unit circuit of a current-level gate driving unit;
performing a touch scanning operation at the touch stage;
within the maintenance time period of the touch stage, maintaining, by a compensation circuit of a current-level gate driving unit, a potential at a pull-up node of the shift register unit circuit; and
within the voltage compensation time period of the touch stage, charging, by the compensation circuit, a storage capacitor sub-circuit of the shift register unit circuit, so as to pull up the potential at the pull-up node.

8. The gate driving method according to claim 7, wherein each driving period comprises a display stage subsequent to the voltage compensation time period,
wherein the gate driving method further comprises:
at the display stage, stopping the touch scanning operation; and
within a first-row display time period of the display stage, outputting, by the shift register unit circuit, a corresponding gate driving signal again under the control of the pull-up node.

9. The gate driving method according to claim 8, further comprising enabling the gate driving circuit to start and end the touch stage through a shift clock signal line and a touch ending signal line.

10. A display device, comprising the gate driving circuit according to claim 6.

11. The gate driving unit according to claim 1, wherein the pull-up node voltage control sub-circuit comprises a first transistor, a gate electrode of the first transistor is connected to the control node, a first electrode of the first transistor is directly connected to the first voltage input end, and a second electrode of the first transistor is connected to the pull-up node voltage output end.

12. The gate driving unit according to claim 11, wherein the control node control sub-circuit comprises:
a second transistor, a gate electrode of the second transistor is connected to the pull-up input end, a first electrode of the second transistor is connected to the voltage compensation clock signal input end, and a second electrode of the second transistor is connected to the control node;
a third transistor, a gate electrode of the third transistor is connected to the pull-up node voltage output end, and a second electrode of the third transistor is connected to the control node; and
a fourth transistor, a gate electrode of the fourth transistor is connected to the voltage compensation resetting end, a first electrode of the fourth transistor is connected to the control node, and a second electrode of the fourth transistor is connected to the second voltage input end.

13. The gate driving unit according to claim 12, further comprising a fifth transistor, wherein a first electrode of the third transistor is connected to the touch ending signal input end via the fifth transistor, a gate electrode and a first electrode of the fifth transistor are connected to the touch ending signal input end, and a second electrode of the fifth transistor is connected to the first electrode of the third transistor.

* * * * *